US010824305B1

(12) United States Patent
Vora et al.

(10) Patent No.: US 10,824,305 B1
(45) Date of Patent: Nov. 3, 2020

(54) GRAPHICAL USER INTERFACES FOR SOFTWARE ASSET MANAGEMENT

(71) Applicant: ServiceNow, Inc., Santa Clara, CA (US)

(72) Inventors: Nirali Vora, Milpitas, CA (US); Yiwen Wang, Santa Clara, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 16/871,468

(22) Filed: May 11, 2020

Related U.S. Application Data

(63) Continuation of application No. 16/242,668, filed on Jan. 8, 2019, now Pat. No. 10,649,630.

(51) Int. Cl.

| | |
|---|---|
| *G06F 3/048* | (2013.01) |
| *G06F 3/0482* | (2013.01) |
| *G06F 3/0483* | (2013.01) |
| *G06F 3/0484* | (2013.01) |
| *G06F 21/10* | (2013.01) |
| *H04L 29/08* | (2006.01) |
| *G06F 9/451* | (2018.01) |

(52) U.S. Cl.
CPC .......... *G06F 3/0482* (2013.01); *G06F 3/0483* (2013.01); *G06F 3/0484* (2013.01); *G06F 9/451* (2018.02); *G06F 21/105* (2013.01); *H04L 67/34* (2013.01); *G06F 2221/0773* (2013.01)

(58) Field of Classification Search
CPC ...... G06F 3/0482; G06F 9/451; G06F 3/0483; G06F 3/0484; H04L 67/34

USPC ......................................................... 715/739
See application file for complete search history.

(56) References Cited

U.S. PATENT DOCUMENTS

| | | |
|---|---|---|
| 6,321,229 B1 | 11/2001 | Goldman |
| 6,609,122 B1 | 8/2003 | Ensor |
| 6,799,189 B2 | 9/2004 | Huxoll |
| 6,816,898 B1 | 11/2004 | Scarpelli |
| 6,895,586 B1 | 5/2005 | Brasher |
| 7,020,706 B2 | 3/2006 | Cates |
| 7,027,411 B1 | 4/2006 | Pulsipher |
| 7,028,301 B2 | 4/2006 | Ding |
| 7,062,683 B2 | 6/2006 | Warpenburg |

(Continued)

OTHER PUBLICATIONS

Servicenow Documentation, Aug. 10, 2018.

*Primary Examiner* — David Phantana-angkool
(74) *Attorney, Agent, or Firm* — Fletcher Yoder PC

(57) ABSTRACT

A computational instance of a remote network management platform may be associated with a managed network and include a database containing: (i) indications of software applications installed on computing devices of the managed network, and (ii) indications of software models that respectively define publisher, product, and licensing information related to the software applications. The computational instance may include a server device configured to (i) generate a representation of a first graphical user interface, (ii) transmit, to a client device associated with the managed network, the representation of the first graphical user interface, (iii) receive, from the client device, a selection, (iv) based on the particular set of the software applications and the particular set of the software models, generate a representation of a second graphical user interface, and (v) transmit, to the client device, the representation of the second graphical user interface.

20 Claims, 12 Drawing Sheets

(56) References Cited

U.S. PATENT DOCUMENTS

| | | |
|---|---|---|
| 7,131,037 B1 | 10/2006 | LeFaive |
| 7,170,864 B2 | 1/2007 | Matharu |
| 7,493,400 B2 | 2/2009 | Loaiza et al. |
| 7,610,512 B2 | 10/2009 | Gerber |
| 7,617,073 B2 | 11/2009 | Trinon |
| 7,685,167 B2 | 3/2010 | Mueller |
| 7,689,628 B2 | 3/2010 | Garg |
| 7,716,353 B2 | 5/2010 | Golovinsky |
| 7,769,718 B2 | 8/2010 | Murley |
| 7,783,744 B2 | 8/2010 | Garg |
| 7,890,802 B2 | 2/2011 | Gerber |
| 7,925,981 B2 | 4/2011 | Pourheidari |
| 7,930,396 B2 | 4/2011 | Trinon |
| 7,933,927 B2 | 4/2011 | Dee |
| 7,945,860 B2 | 5/2011 | Vambenepe |
| 7,966,398 B2 | 6/2011 | Wiles |
| 8,051,164 B2 | 11/2011 | Peuter |
| 8,082,222 B2 | 12/2011 | Rangarajan |
| 8,151,261 B2 | 4/2012 | Sirota |
| 8,224,683 B2 | 7/2012 | Manos |
| 8,266,096 B2 | 9/2012 | Navarrete |
| 8,380,645 B2 | 2/2013 | Kowalski |
| 8,402,127 B2 | 3/2013 | Solin |
| 8,457,928 B2 | 6/2013 | Dang |
| 8,478,569 B2 | 7/2013 | Scarpelli |
| 8,554,750 B2 | 10/2013 | Rangaranjan |
| 8,612,408 B2 | 12/2013 | Trinon |
| 8,646,093 B2 | 2/2014 | Myers |
| 8,674,992 B2 | 3/2014 | Poston |
| 8,689,241 B2 | 4/2014 | Naik |
| 8,743,121 B2 | 6/2014 | De Peuter |
| 8,745,040 B2 | 6/2014 | Kowalski |
| 8,812,539 B2 | 8/2014 | Milousheff |
| 8,818,994 B2 | 8/2014 | Kowalski |
| 8,832,652 B2 | 9/2014 | Mueller |
| 9,015,188 B2 | 4/2015 | Behne |
| 9,037,536 B2 | 4/2015 | Vos |
| 9,098,322 B2 | 8/2015 | Apte |
| 9,137,115 B2 | 9/2015 | Mayfield |
| 9,239,857 B2 | 1/2016 | Trinon |
| 9,317,327 B2 | 4/2016 | Apte |
| 9,323,801 B2 | 4/2016 | Morozov |
| 9,412,084 B2 | 9/2016 | Kowalski |
| 9,467,344 B2 | 10/2016 | Gere |
| 9,535,737 B2 | 1/2017 | Joy |
| 9,557,969 B2 | 1/2017 | Sharma |
| 9,613,070 B2 | 4/2017 | Kumar |
| 9,645,833 B2 | 5/2017 | Mueller |
| 9,654,473 B2 | 5/2017 | Miller |
| 9,659,051 B2 | 5/2017 | Hutchins |
| 9,766,935 B2 | 9/2017 | Kelkar |
| 9,792,387 B2 | 10/2017 | George |
| 9,805,322 B2 | 10/2017 | Kelkar |
| 9,819,729 B2 | 11/2017 | Moon |
| 9,852,165 B2 | 12/2017 | Morozov |
| 10,002,203 B2 | 6/2018 | George |
| 10,331,623 B2 | 6/2019 | Xu et al. |
| 10,433,017 B2 * | 10/2019 | Brown ............... H04N 21/6125 |
| 10,437,717 B2 | 10/2019 | Kidron et al. |
| 10,572,497 B2 * | 2/2020 | DeLuca ............... G06F 3/0484 |
| 10,649,630 B1 * | 5/2020 | Vora ............... H04L 67/34 |
| 2013/0019028 A1 | 1/2013 | Myers et al. |
| 2016/0349949 A1 | 12/2016 | Miller et al. |
| 2019/0266232 A1 * | 8/2019 | Khan ............... G06T 11/206 |
| 2019/0339855 A1 * | 11/2019 | Walkin ............... G06F 3/0485 |
| 2020/0057555 A1 * | 2/2020 | Walkin ............... G06F 3/04883 |

* cited by examiner

FIG. 7A

GRAPHICAL USER INTERFACES FOR SOFTWARE ASSET MANAGEMENT

CROSS-REFERENCE TO RELATED APPLICATIONS

This application is a continuation of U.S. patent application Ser. No. 16/242,668, filed Jan. 8, 2019, which is hereby incorporated by reference in its entirety.

BACKGROUND

Software asset management services involve cataloguing software installations on a number of computing devices on a managed network in order to determine an amount of compliant and/or noncompliant licenses on those computing devices. Information related to the licenses may be stored in a database as software models. These software models may then be used as the basis for managing the software installations on the computing devices.

SUMMARY

On a large managed network, such as an enterprise network made up of hundreds of computing devices, managing the allocation and usage of software applications may be a complex endeavor that requires a significant amount of resources. The information relating to the software applications may be stored in a database accessible by the computing devices on the managed network. The information may include, for example, the number of available licenses of a particular software application based on a software license agreement. For example, the managed network may have 150 licenses of ADOBE ACROBAT® available to allocate to users. A network administrator of the managed network may allocate 140 of the licenses, while keeping 10 for future allocation. Over time, one or more of the users that were allocated the licenses may leave (e.g., resigned, were fired, etc.). These licenses that were allocated would now be wasted because they would cease to be used.

Current graphical user interfaces (GUIs) that facilitate this identification of allocated and unallocated software may be complex and confusing to all but the experienced user. The GUIs may eventually provide the relevant information the network administrator is looking for, but the process of finding the information may unduly time consuming. In some cases, conventional GUIs for software asset management may involve a single pane in which a multitude of information relating to the software application may be displayed.

Therefore, there exists a need for a GUI that streamlines software asset management for a number of different software applications. An improved GUI may provide an overview of all software applications currently licensed in the managed network as a number of selectable cards. The selectable cards may be configured to allow a user to drill down into a detailed list-view for each respective software application. This respective list-view may display important information about the software license allocation, including but not limited to an number of licenses that are being allocated and used and/or unused. This information may be referred to as software models. As an additional feature, this improved GUI may indicate whether the managed network is over or under paying for the software based on the license agreement. To that end, the improved GUI may provide remediation options for a user that allow the user to fix any discrepancies in over and/or under payment for the software licenses.

Accordingly, a first example embodiment may involve generating, by a server device, a representation of a first graphical user interface. The server device may be associated with a computational instance of a remote network management platform and the computational instance may be associated with a managed network. The computational instance may include a database containing: (i) indications of software applications installed on computing devices of the managed network, and (ii) indications of software models that respectively define publisher, product, and licensing information related to the software applications. The first graphical user interface may include a card-based view of publishers defined by the software models, where each card in the card-based view displays a true-up amount, an overage amount, and a potential savings for software applications respectively associated with one of the publishers.

The first example embodiment may also involve transmitting, by the server device and to a client device associated with the managed network, the representation of the first graphical user interface.

The first example embodiment may also involve receiving, by the server device and from the client device, a selection of a particular card of the card-based view. The particular card may be associated with a particular publisher, and the particular publisher may be associated with a particular set of the software applications that are respectively defined by a particular set of the software models.

The first example embodiment may also involve, based on the particular set of the software applications and the particular set of the software models, generating, by the server device, a representation of a second graphical user interface. The second graphical user interface may include a list-based view that specifies in line items, for each of the particular set of the software applications: (i) respective product information, (ii) a respective status indicator that identifies whether installations of the respective software application comply with licensing information related to the respective software application, (iii) a respective true-up amount related to the respective software application, (iv) a respective overage amount related to the respective software application, and (v) a respective potential savings related to the respective software application.

The first example embodiment may also involve transmitting, by the server device and to the client device, the representation of the second graphical user interface.

In a second example embodiment, an article of manufacture may include a non-transitory computer-readable medium, having stored thereon program instructions that, upon execution by a computing system, cause the computing system to perform operations in accordance with the first example embodiment.

In a third example embodiment, a computing system may include at least one processor, as well as memory and program instructions. The program instructions may be stored in the memory, and upon execution by the at least one processor, cause the computing system to perform operations in accordance with the first example embodiment.

In a fourth example embodiment, a system may include various means for carrying out each of the operations of the first example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 7A depicts a publisher software application management pane of a GUI, in accordance with example embodiments.

DETAILED DESCRIPTION

Figure 1:
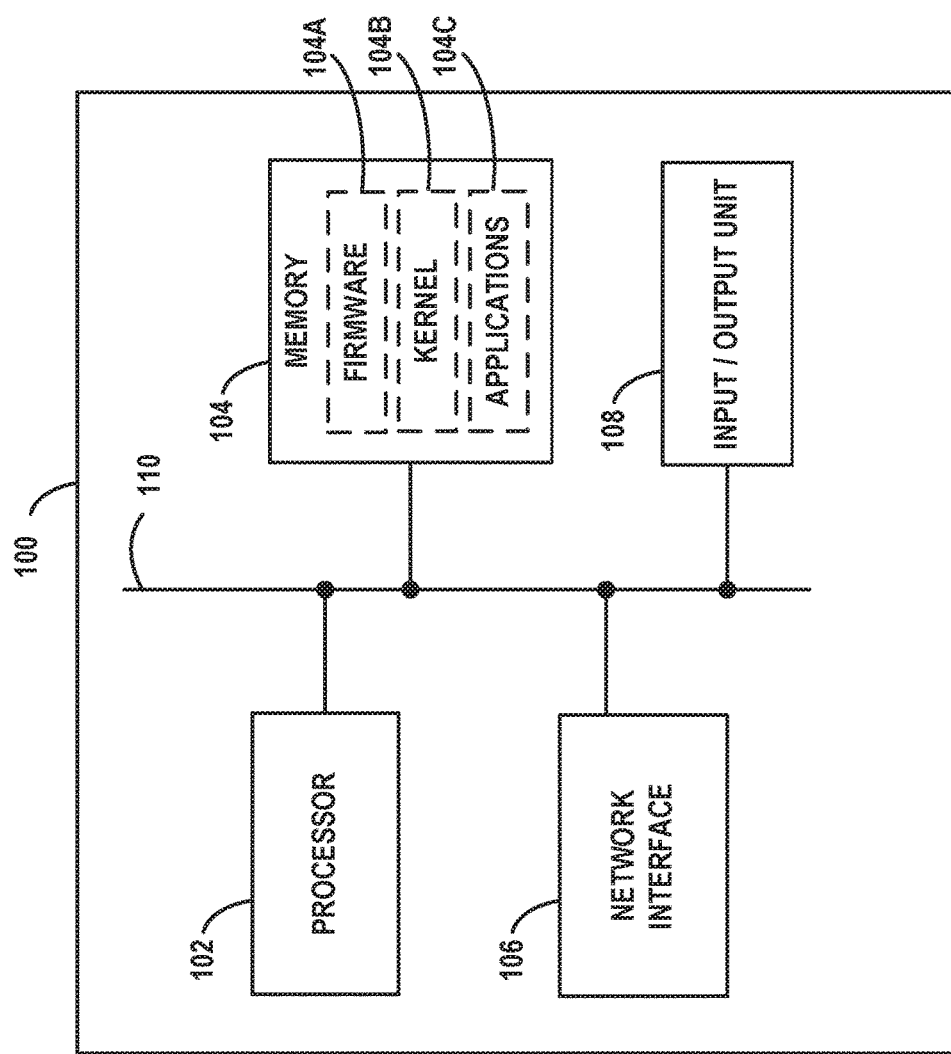
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
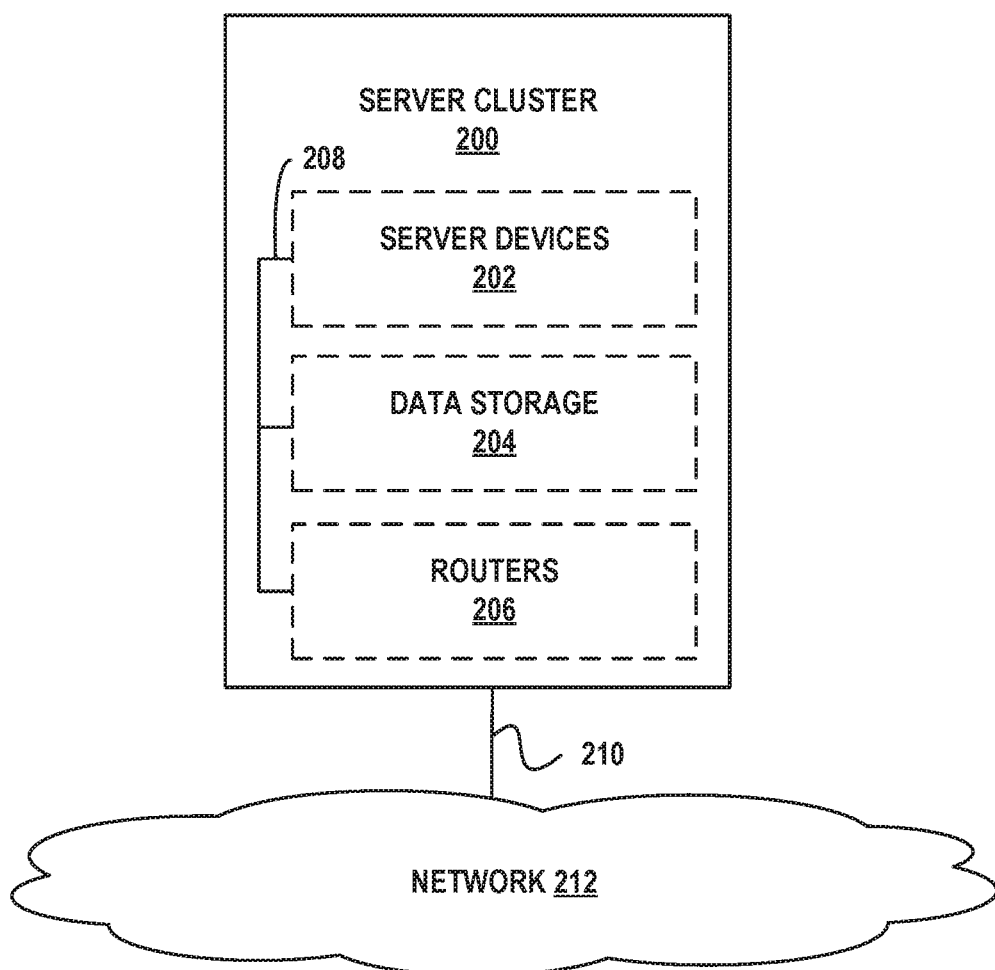
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. EXAMPLE REMOTE NETWORK MANAGEMENT ARCHITECTURE

Figure 3:
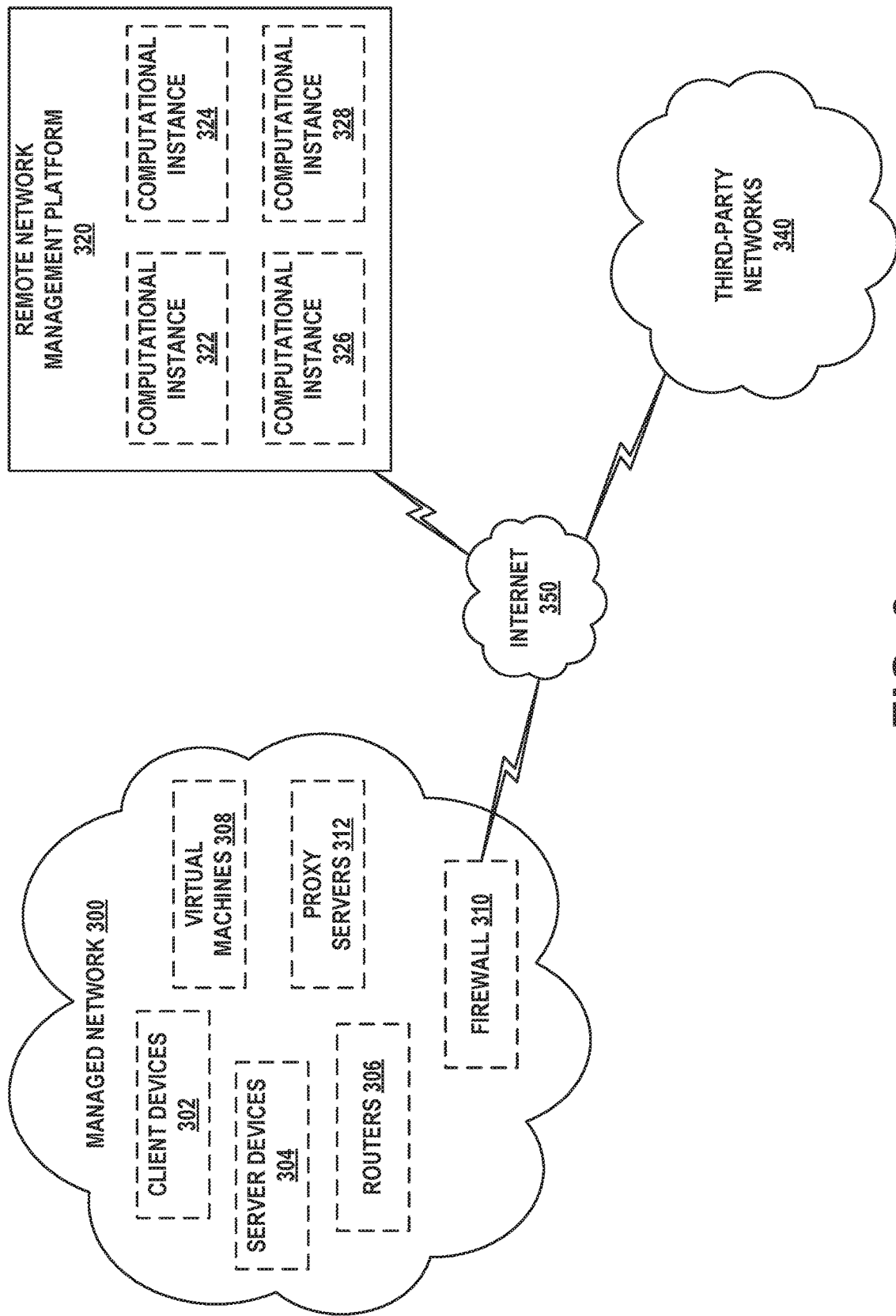
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion.

Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent one or more server devices and/or one or more databases that provide a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows with one or more database tables).

For purpose of clarity, the disclosure herein refers to the physical hardware, software, and arrangement thereof as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of physical or virtual servers and database devices. Such a central instance may serve as a repository for data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
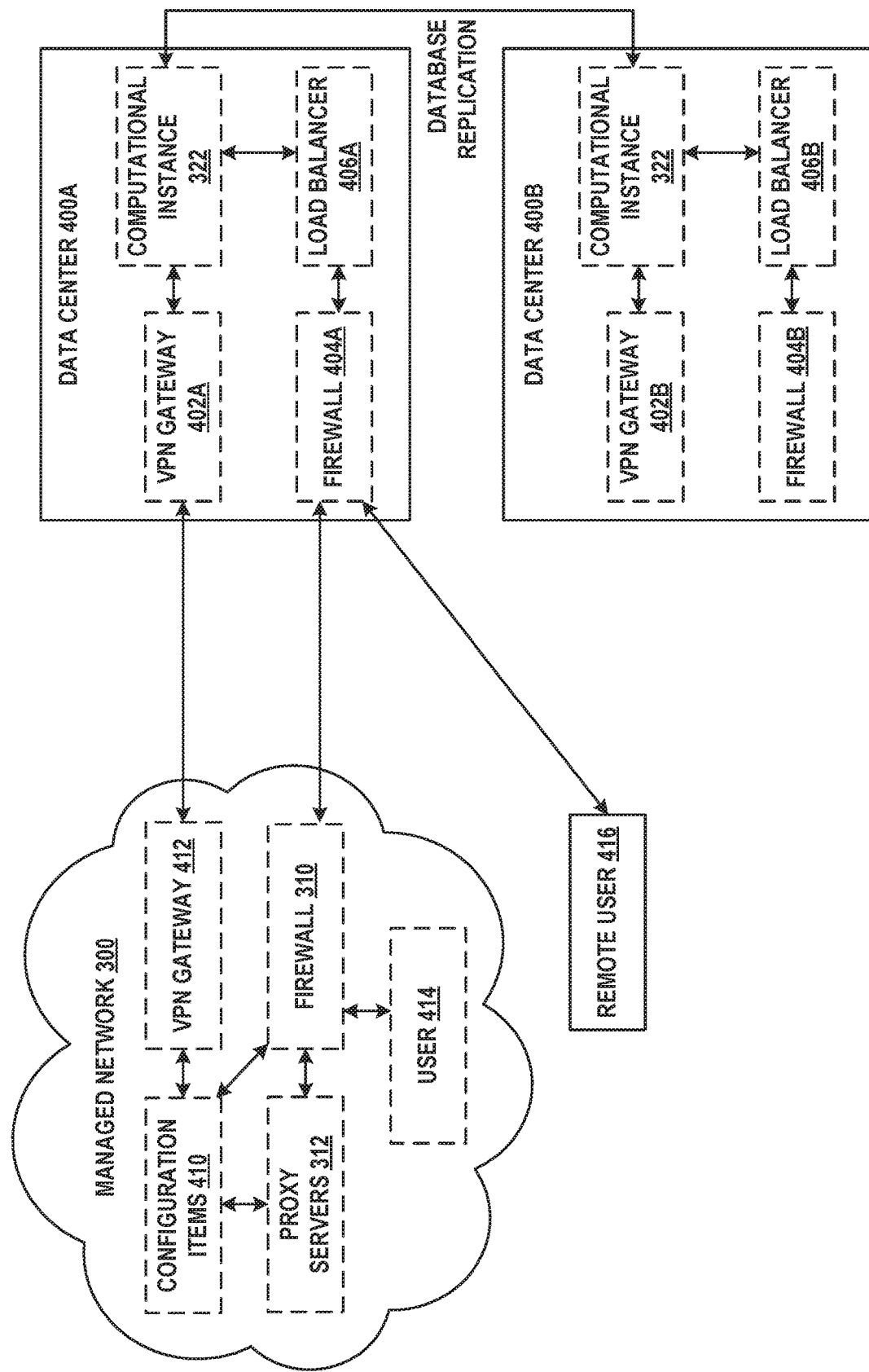
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
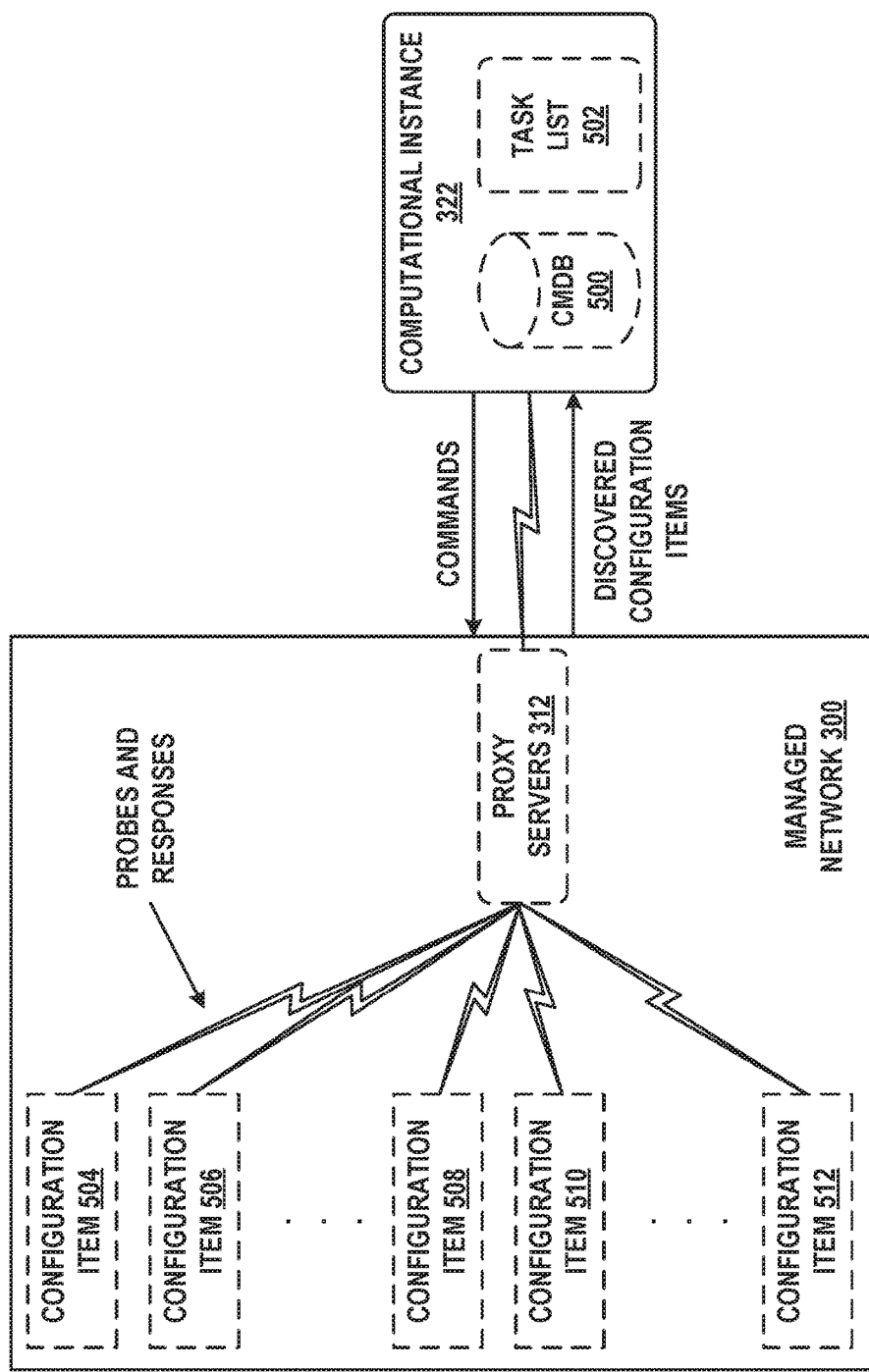
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address (es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
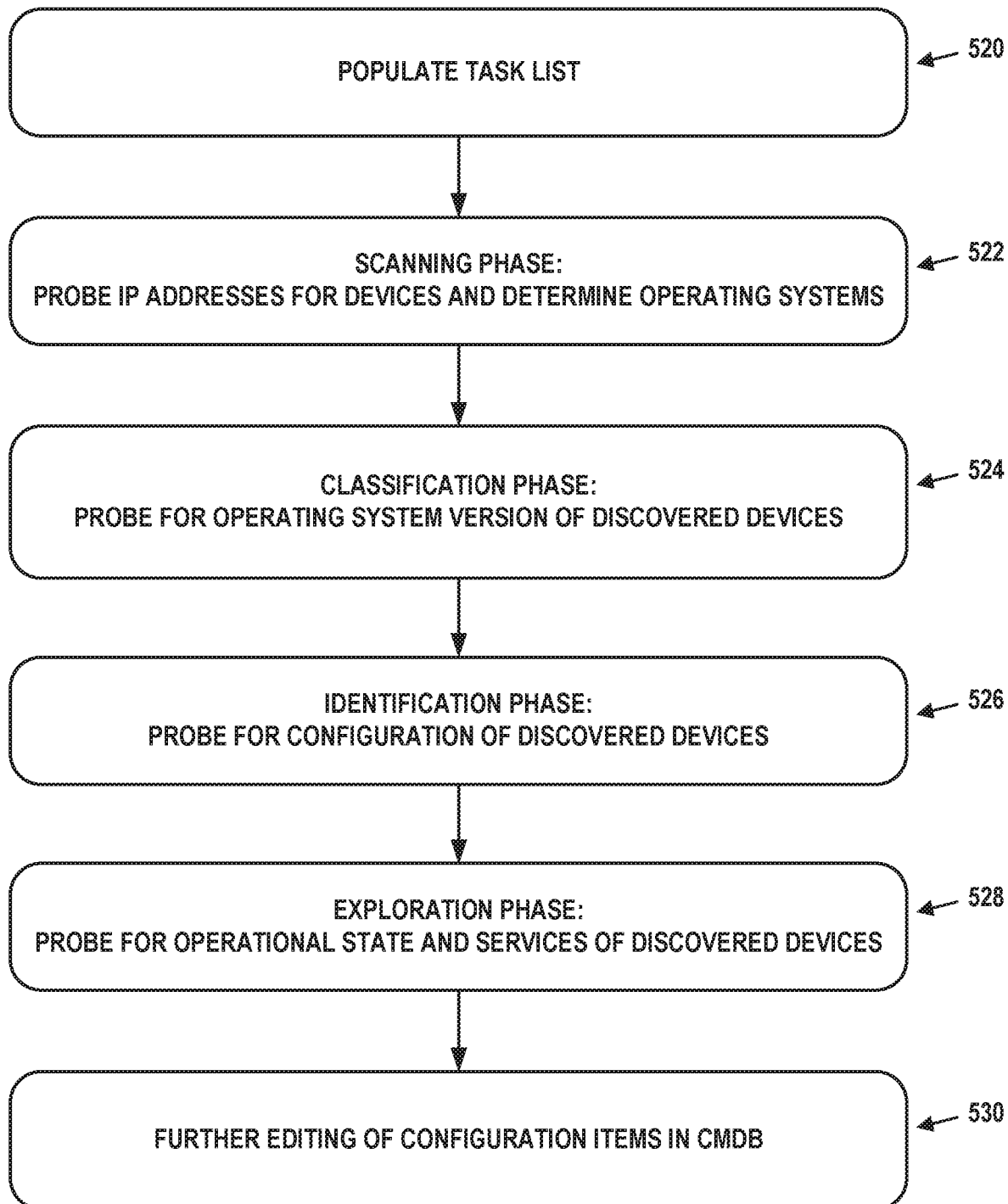
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. IMPROVED GRAPHICAL USER INTERFACES FOR SOFTWARE ASSET MANAGEMENT

As described herein, the term "pane" may refer to a GUI component that contains one or more locations in which to display information, and/or one or more user-selectable items such as buttons or tabs. In some embodiments, a pane may be equivalent to, or contained within, a page or a GUI window, though such a window may contain multiple panes. Buttons and/or tabs may be graphical control elements that display additional information within the pane. The GUIs and/or panes described herein may be provided to users when they access a computational instance on a remote network management platform, such as computational instance 322 within remote network management platform 320 as described in FIG. 3.

As previously discussed, management of software licenses can be a cumbersome and confusing task. The embodiments herein address these issues by way of a series of GUI panes that provide a logical workflow for software asset management. As a result of these embodiments, software assets (e.g., applications) can be more effectively managed, resulting in a maximum cost savings for managed network 300, while ensuring compliancy under a software license agreement.

Generally, software license agreements specify that a managed network 300 may be allocated a specified number of software installations in return for a commensurate amount of money. This process can become complicated when managed network 300 has hundreds, if not thousands, of software license agreements. Further, keeping track of whether managed network 300 is complying with the software license agreements can be a cumbersome and confusing task. For example, a network administrator for managed network 300 may purchase 150 licenses for a particular software application and allocate 140 of those licenses to various users on managed network 300. This information related to the software applications may be referred to as software models—software models define the publisher, product, and licensing information related to the software applications.

Other than merely keeping track of the number of software licenses that were allocated and not allocated, the network administrator may also need to keep track of the number of (i) the number of software installations that have been allocated and are in use, (ii) the number of installations that are being used but were not originally allocated, and (iii) the number of installations that were allocated but not being used. This may be beneficial because if the network administrator can identify users that are using unlicensed software, the network administrator can move forward with an appropriate remedy (e.g., removing the unlicensed software or purchasing additional licenses). This may further be beneficial because it may allow the network administrator to reallocate unused software applications to users that are in need, resulting in a greater cost savings to managed network 300.

However, this identification and remediation of software asset problems can be time consuming because conventional GUIs force a network administrator to search for this information for each particular software application, which can cause the network administrator to lose context of the overall management of software assets, making it difficult to switch from one software asset to another.

Example panes are shown in FIGS. 6, 7A, 7B, 7C, and 7D. These panes may allow a user to easily manage all of the software assets used within managed network 300.

Figure 6:
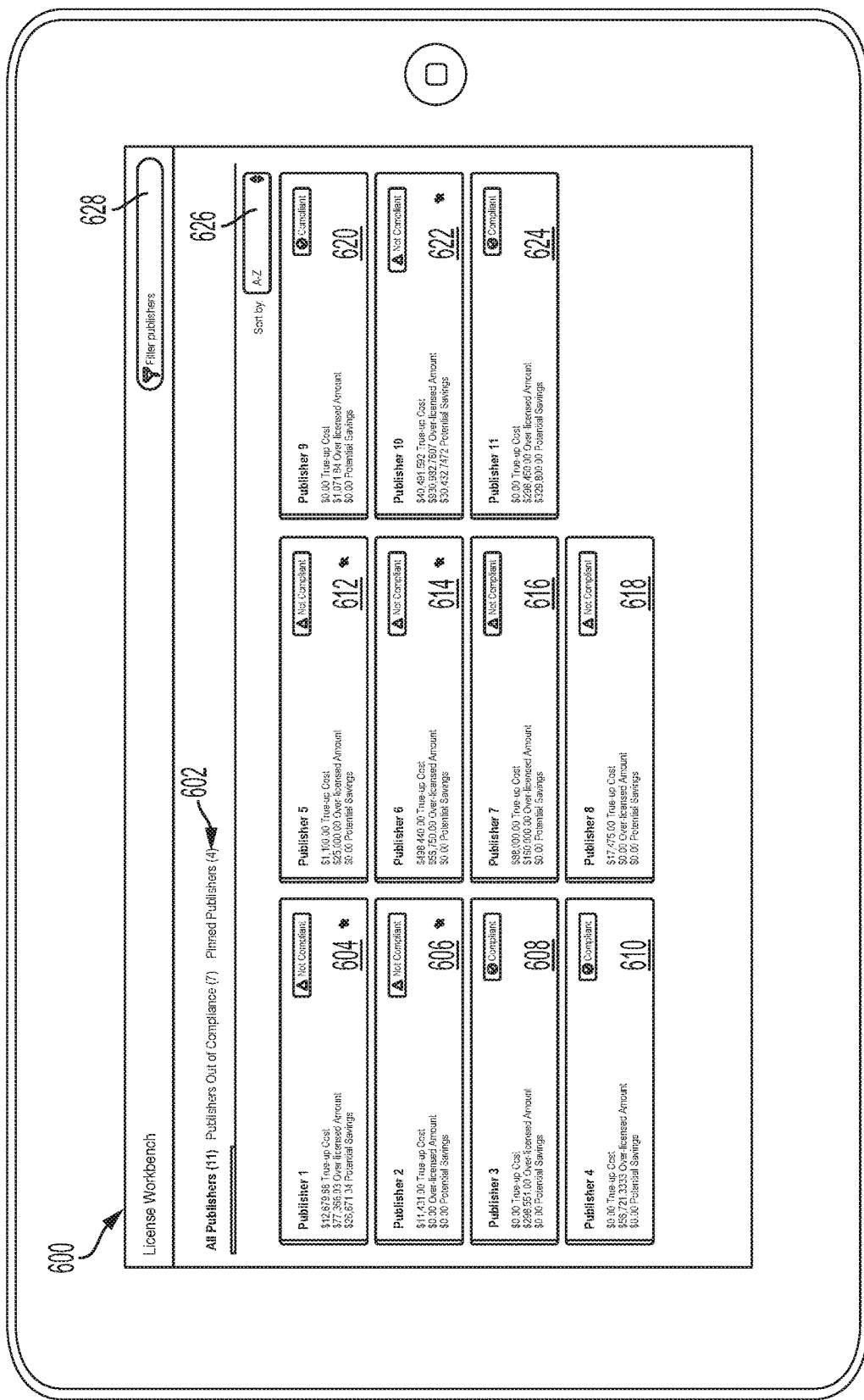
FIG. 6 depicts a software asset management pane of a GUI, in accordance with example embodiments.

FIG. 6 depicts software asset management pane 600 that includes tabs 602, cards 604, 606, 608, 610, 612, 614, 616, 618, 620, 622, and 624, sort option 626, and search bar 628. Although FIG. 6 depicts pane 600 being displayed on a tablet device, the GUIs discussed herein could be displayed a web pages or within native applications on any type of computing device.

Tabs 602 may allow a user to filter the cards 604, 606, 608, 610, 612, 614, 616, 618, 620, 622, and 624 according to specific criteria. For example, tabs 602 may include options to display the cards 604, 606, 608, 610, 612, 614, 616, 618, 620, 622, and 624 for (i) all publishers, (ii) publishers out of compliance, or (iii) pinned publishers. A publisher may be the provider of software under a software license agreement (i.e., ADOBE SYSTEMS®, ORACLE®, MICROSOFT®, etc.). The all publishers display may show cards for all of the publishers from which managed network 300 has purchased software under a software license agreement. The publishers out of compliance display may show cards for the publishers for which managed network 300 has software allocations that are not compliant. The pinned publishers display may show cards for the publishers for which a user "pinned" (e.g., marked as special) within software asset management pane 600. A user may pin a publisher if the user frequently manages software assets for that publisher. Pinning a publisher may additionally cause the GUI to display a marker on the publishers respective card, allowing a user to quickly identify which publisher cards have been previously pinned.

Cards 604, 606, 608, 610, 612, 614, 616, 618, 620, 622, and 624 may be graphical representations within pane 600 that include high-level information regarding the software assets for a particular publisher. As discussed previously, this information may pertain to an over or under allocation of software licenses for that particular publisher. Using the number of licenses over or under allocated, one can calculate (i) the amount of money required to comply with a license agreement (assuming there is an over allocation of licenses), (ii) the amount of money paid for licenses that are not being used, and (iii) the potential savings that can be had if one or more remediation options are taken. To that end, cards 604, 606, 608, 610, 612, 614, 616, 618, 620, 622, and 624 may display (i) a true-up cost (i.e., the amount necessary to become compliant), (ii) an over-licensed amount (i.e., the amount overspent for the software), and (iii) potential savings. The true-up cost may relate to the amount necessary to purchase additional licenses in order to remedy compliancy issues. The over-licensed amount may relate to the cost of the licenses owned but not being used. The potential savings may relate to the amount managed network 300 could save by taking one or more remediation options.

This information is then used to display a status of "Compliant" or "Not Compliant" on the publisher card. A status of "Compliant" is attributed to a publisher with a true-up cost of $0. A status of "Not Compliant" is attributed to a publisher with a true-up cost of greater than $0, because that is an indication that there are software applications being used but are not being paid for.

For example, card 604 may display information related to Publisher 1. As shown, the software provided by Publisher 1 has a true-up cost of $12,649.66, an over-licensed amount of $77,366.03, and a potential savings of $26,671.34. Also as shown, Publisher 1 is flagged as "Not Compliant," which is due to Publisher 1 having a true-up cost of greater than $0 ($12,649.66).

Sort option 626 may include a drop-down menu configurable to allow a user to sort cards 604, 606, 608, 610, 612, 614, 616, 618, 620, 622, and 624 (i) alphabetically, (ii) by compliancy, (iii) by true-up cost, (iv) by over-licensed amount, or (v) by amount of potential savings. This may be beneficial for a user because it allows the user to identify publishers for a particular purpose. For example, if a user wants to quickly identify the publishers for which managed network 300 was using non-compliant software, the user could sort by compliancy in sort option 626. In another example, if a user wanted to quickly identify the publishers for which managed network 300 could save the most money by renegotiating a software licenses agreement, the user could sort by amount of potential savings in sort option 626.

Search bar 628 may include a blank field in which a user can enter a string of characters to identify a particular publisher. This may be beneficial if managed network 300 has hundreds of software licenses and a user wants to pinpoint the information for a specific publisher. For example, if the user wants to view the information related to MICROSOFT®, the user may search "Microsoft" in search bar 628. In response, the GUI may display a card with information related to MICROSOFT® (not shown in FIG. 6).

In operation, a user may select one of cards 604, 606, 608, 610, 612, 614, 616, 618, 620, 622, and 624 to see a more detailed view for the respective publisher. Upon receiving the card selection, the GUI might display such a detailed view.

Figure 7A:
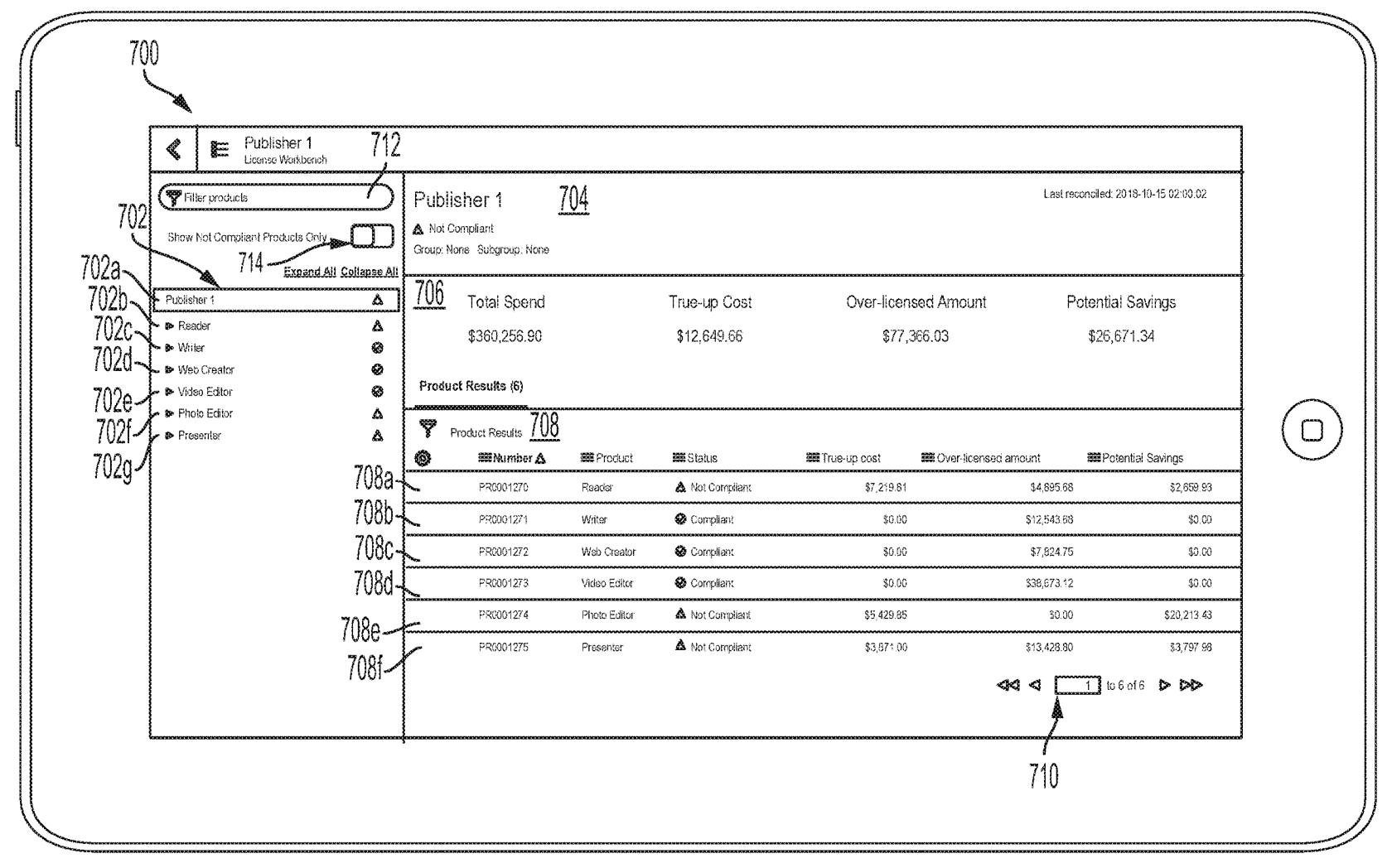

FIG. 7A depicts a publisher software application management pane 700, which includes a navigation pane 702, header 704, summary 706, table 708, table navigator 710, search bar 712, and filter toggle 714.

Navigation pane 702 is a selectable menu that allows a user to drill down into specific software applications provided by the selected publisher. Navigation pane 702 includes navigation selections 702a, 702b, 702c, 702d, 702e, 702f, and 702g. Navigation selections 702a, 702b, 702c, 702d, 702e, 702f, and 702g may correspond to software applications provided by the selected publisher. For example, as shown, navigation selection 702a corresponds to "Publisher 1," navigation selection 702b corresponds to the software application "Reader," navigation selection 702c corresponds to the software application "Writer," navigation selection 702d corresponds to the software application "Web Creator," navigation selection 702e corresponds to the software application "Video Editor," navigation selection 702f corresponds to the software application "Photo Editor," and navigation selection 702g corresponds to the software application "Presenter."

Header 704 depicts the name of the selected publisher. As shown in FIG. 7A, header 704 displays "Publisher 1." This may be beneficial because it signals to a user which publisher the information in pane 700 pertains.

Summary 706 depicts summarized information related to the selection made in navigation pane 702. The summarized information may include the total spend, the true-up cost, the over-licensed amount, and the potential savings with respect to the particular publisher or software application. The total spend may relate to the total amount spent on the software licenses for the particular publisher or software application. As shown in FIG. 7A, the total amount spent for all software application provided by Publisher 1 is $360,256.90, the true-up cost is $12,649.66, the over-licensed amount is $77,366.03, and the potential savings is $26,671.34.

Table 708 may be a detailed list-view of software applications or license types that correspond to a selection made in navigation pane 702. Table 708 may include table rows 708a, 708b, 708c, 708d, 708e, and 708f. Table rows 708a, 708b, 708c, 708d, 708e, and 708f may include the detailed information corresponding to the section in navigation pane 702. Table 708 may include columns with information including a product or license type for a product. The columns may include information such as (i) the product number, (ii) the product name, (iii) the compliant status of the product, (iv) the true-up cost for the respective product, (v) the over-licensed amount for the respective product, and (vi) the potential savings for the respective product. For example, as shown in FIG. 7A, navigation selection 702a labeled "Publisher 1" is selected, and table 708 displays the software applications provided by Publisher 1 in table rows 708a, 708b, 708c, 708d, 708e, and 708f. Because navigation selection 702a is selected, table 708 is populated with the various software applications provided by Publisher 1. If a different navigation selection was selected, table 708 would be populated by the various license types corresponding to the software application selected in navigation pane 702.

Table navigator 710 may include one or more buttons that allow as user to view multiple pages of table 708 (if they exist). This may be beneficial when table 708 displays a large number of software applications or license types.

Search bar 712 may include a blank field in which a user can enter a string of characters to identify a particular software application pertaining to the selected publisher. This may be beneficial if the selected publisher has a large number of software applications, making it difficult for the user to quickly find a particular software application without a search function.

Filter toggle 714 may include a user selectable toggle that filters the available selections in navigation pane 702 to only show products or licenses that are not compliant. This may be beneficial because it allows a user to quickly determine which products and licenses are not compliant, which in turn will allow the user to more quickly take remedial action.

In operation, selection of any one of navigation selections 702a, 702b, 702c, 702d, 702e, 702f, and 702g causes the information in table 708 to change. For example, if a user selects navigation selection 702b, table 708 may populate with information related to the various license types for the "Reader" software application. The license types may include a "Professional" license and a "Standard" license, which may depend on the publisher and the software type (i.e., each publisher might have their own preset license types for their software applications).

Figure 7B:
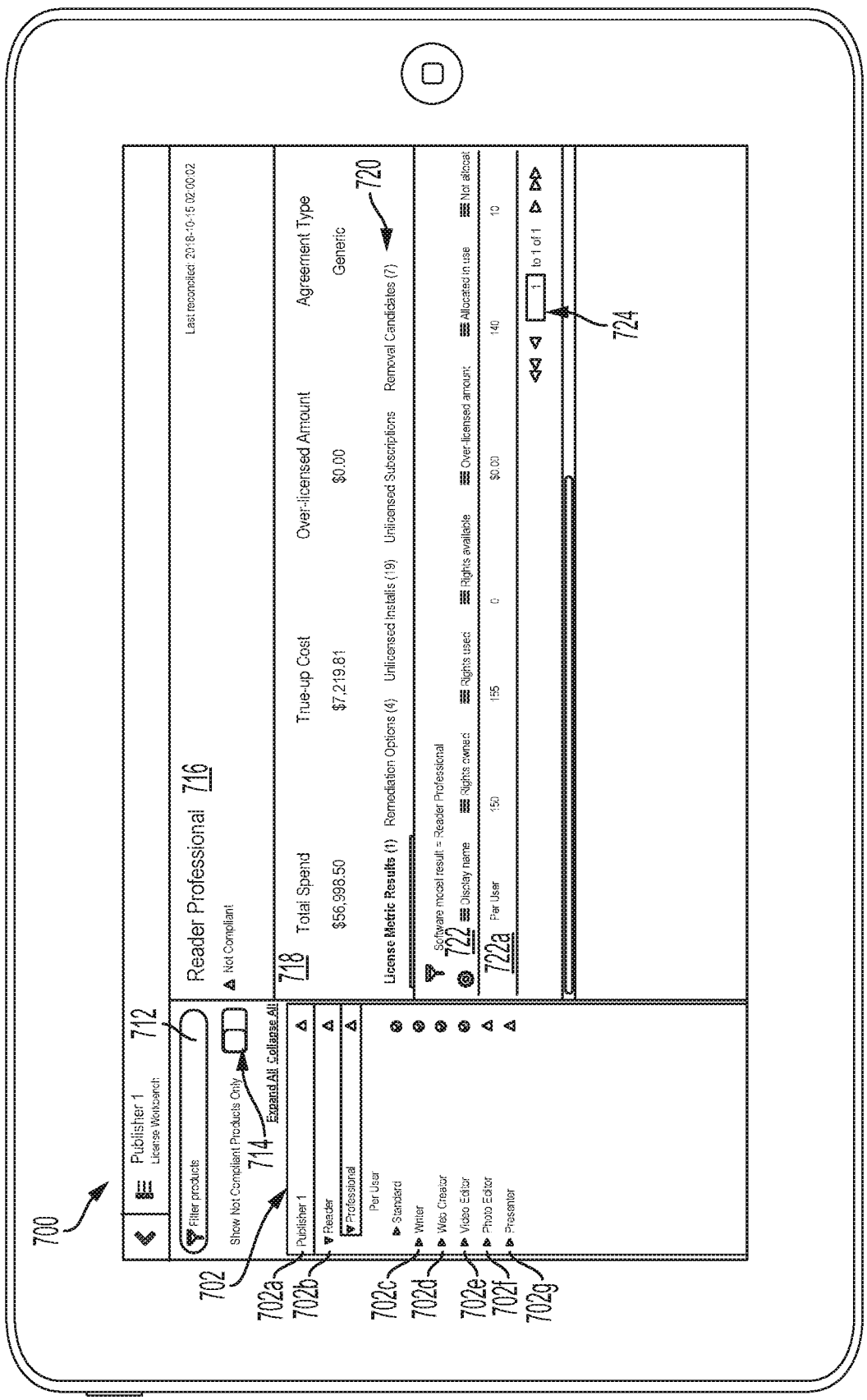
FIG. 7B depicts a detailed view of a particular publisher software application management pane of a GUI, in accordance with example embodiments.

FIG. 7B depicts a detailed view of a particular publisher software application management pane 700. The elements of FIG. 7B may be displayed when a user selects navigation selection 702b of navigation pane 702. Publisher software application management pane 700 includes the same navigation pane 702, search bar 712, and filter toggle 714 as FIG. 7A, but also includes header 716, summary 718, tabs 720, table 722, and table navigator 724.

Header 716 may display the title of the selected license type within navigation pane 702. As shown in FIG. 7B, header 716 displays the title "Reader Professional," since the "Professional" license type of the "Reader" software application is selected in navigation pane 702.

Summary 718 may display information related to the allocation of the selected license for the selected software application. As shown in FIG. 7B, the total spend for the "Professional" license type of the "Reader" software application is $56,998.50, the true-up cost is $7,219.81, the over-licensed amount is $0.00, and the agreement type is "Generic." The agreement type may relate to whether the agreement is industry standard or specialized.

Tabs 720 may include selectable options to further configure table 722. Tabs 720 may include options to display "License Metric Results," "Remediation Options," "Unlicensed Installs," "Unlicensed Subscriptions," and "Removal Candidates." "License Metric Results" may relate to an overview of the license information related to the selected software application. "Remediation Options" may include various options for addressing potential licensing problems. "Unlicensed Installs" may include a list of software installations that do not have an allocated license (i.e., a list of computing devices using the "Reader" software application without permission). "Unlicensed Subscriptions" may include a list of software installations that are being used without a subscription allocation. "Removal Candidates" may include a list of computing devices for which a user can revoke allocations or uninstall software that is being used but hasn't been allocated a license.

In operation, selecting "License Metric Results" may cause table 722 to display general information about the license type of the selected software application, including the number of licenses owned, the number of licenses allocated, the number of available licenses to allocate, the over-licensed amount, the number of licenses that are allocated and in use, and the number of licenses that are not allocated. Selecting "Remediation Options" may cause table 722 to display available remediation actions a user can take to remedy any potential problems with the software license allocations. Selecting "Unlicensed Installs" may cause table 722 to display the users or computers on which unlicensed software is installed and being used. Selecting "Unlicensed Subscriptions" may cause table 722 to display the users or computers on which unlicensed software subscriptions are installed and being used. Selecting "Removal Candidates" may cause table 722 to display the users or computers on which unlicensed software can be easily removed.

Table 722, as discussed above, is configurable based on the selection of one of tabs 720 and includes table row 722a. Table 722 may contain additional table rows based on the selection of tabs 720. As shown in FIG. 7B, table 722 shows information related to the "License Metric Results" tab, which is selected in tabs 720. Table row 722a shows information on a "Per User" basis for the "Professional" license type of the "Reader" software application. This information shows that managed network 300 owns 150 licenses, 155 instances of the software application are being used, there are 0 licenses available to allocate, there is an over-licensed amount of $0, there are 140 licenses allocated and in use, there are 10 licenses not allocated, there are 15 licenses that are being used but not allocated, and there are 5 licenses needed to become compliant with the license agreement. Because there are 15 licenses that are being used that were never allocated (i.e., 15 unlicensed installations) and only 10 licenses available to allocate, the "Professional" license type of the "Reader" software application is not compliant with the software license agreement. To render the "Reader" software application compliant, a user could take remediation actions such as, for example, (i) remotely uninstalling all 15 unlicensed installations of the software, (ii) remotely uninstalling 5 unlicensed installations of the software and allocating licenses to the other 10 unlicensed installations, or (iii) securing 5 additional licenses and allocating 15 licenses to all 15 unlicensed installations.

Table navigator 724 may include one or more buttons that allow as user to view multiple pages of table 722 (if they exist). This may be beneficial when table 722 displays a large number of license types.

In operation, when navigation selection 702b is selected, navigation pane 702 expands to show additional selectable options within navigation selection 702b. These additional selectable options correspond to the various license types for the selected software application. As shown in FIG. 7B, the software application "Reader" has two types of licenses: "Professional" and "Standard." The professional license type may give a user access to additional features not available in the standard license type. Further, selecting a license type within navigation selection 702b may cause header 716, summary 718, tabs 720, and table 722 to populate information relating to the selected license type.

For example, selection of the "Professional" license type within navigation selection 702b may cause header 716 to display "Professional," indicating that the user is viewing information related to the "Professional" license type of the "Reader" software application. This selection may also cause summary 718 to populate with software allocation information related to the "Professional" license type of the "Reader" software application. As shown in FIG. 7B, the total spend for the "Professional" license type of the "Reader" software application is $56,998.50, the true-up cost is $7,219.81, the over-licensed amount is $0.00, and the agreement type is "Generic."

After viewing the information in the particular publisher software application management pane 700, the user might determine it wants to take remedial action to cause the software application to become compliant under the license agreement. To achieve this, the user may select "Remediation Options" in tabs 720.

Figure 7C:
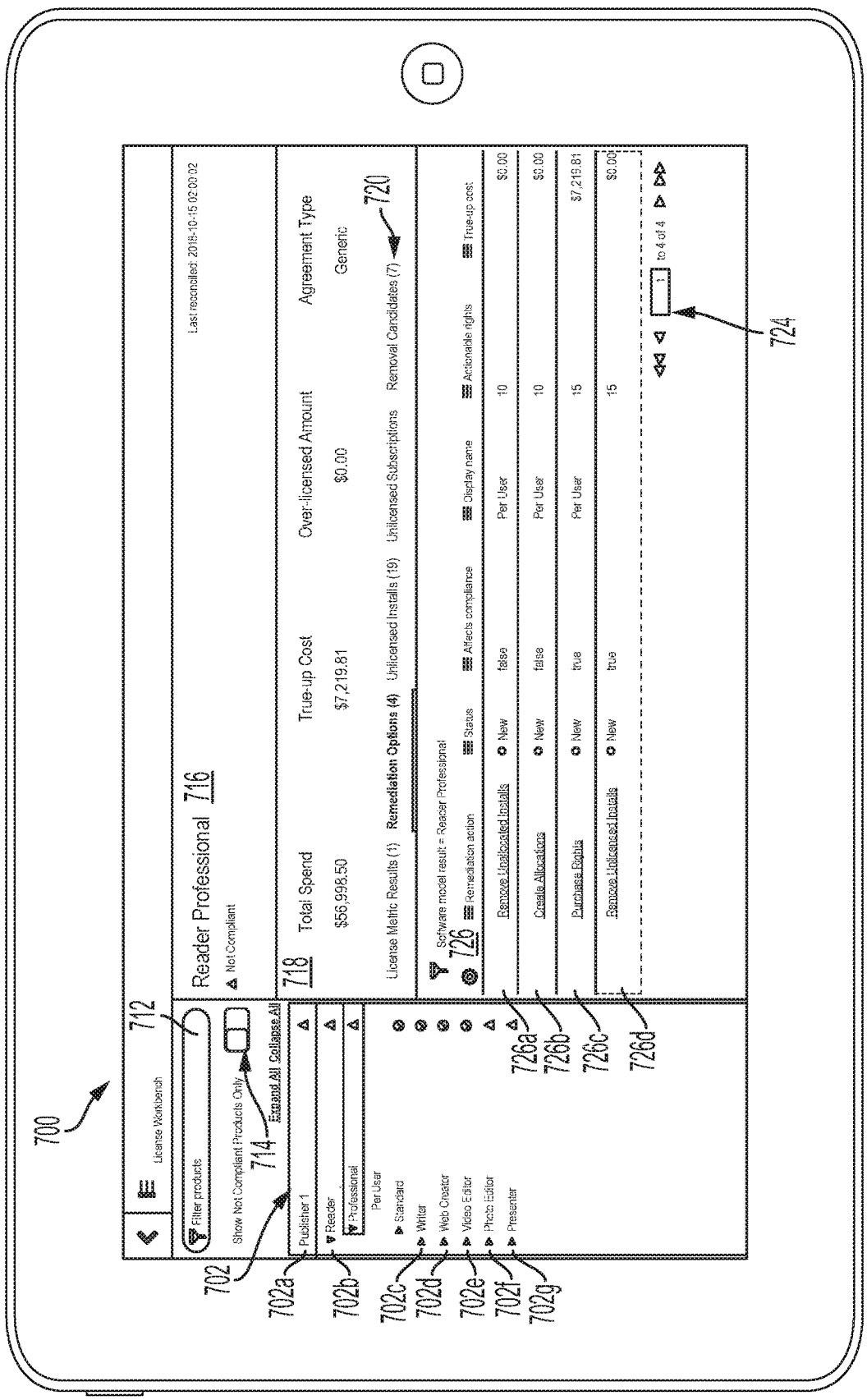
FIG. 7C depicts a remediation view of a particular software application management pane of a GUI, in accordance with example embodiments.

FIG. 7C depicts a remediation view of a particular software application management pane 700. The elements of FIG. 7C may be displayed when a user selects "Remediation Options" in tabs 720. Remediation view of publisher software application management pane 700 includes the same navigation pane 702, search bar 712, filter toggle 714, header 716, summary 718, tabs 720, and table navigator 724 as FIG. 7C. However, remediation view of publisher software application management pane 700 includes table 726, which is populated with information corresponding to the user's remediation options.

Table 726 may include table rows 726a, 726b, 726c, and 726d. Table rows 726a, 726b, 726c, and 726d may include information related to the various remediation options available to the user in order to change the software license status from not compliant to compliant. Each option may have corresponding information, located in the columns of table 726, that indicate (i) the name of the remediation action, (ii) the status of the action, (iii) whether the remediation action is capable of affecting compliance, (iv) the display name of the license, (v) the number of actionable rights (licenses), and (vi) the true-up cost for execution the remediation option.

For example, as shown in FIG. 7C, table row 726c shows the option to "Purchase Rights," which may involve purchasing additional licenses. Table 726 indicates that this remediation action will affect compliance, that 5 licenses would need to be acquired, and that the true-up cost for that acquisition would cost $7,219.81. The "Purchase Rights" option in table row 726c may be selectable to open a browser that is configured to allow the user to purchase additional "Professional" licenses for the "Reader" software application directly or indirectly from Publisher 1.

In another example, as shown in FIG. 7C, table row 726d shows the option to "Remove Unlicensed Installs," which may involve uninstalling instances where the software is being used improperly. Table 726 indicates that this remediation action will affect compliance, that 15 installations could be removed, and that this remediation action would not cost anything. This remediation option may be beneficial because it would allow a user to take action that would make the software compliant without an associated cost. However, this option may be less desirable in situations where the unlicensed installations are necessary for their respective users to work. In these situations, it may be more beneficial to purchase the additional licenses.

Also, the "Remove Unlicensed Installs" option in table row 726d may be selectable to cause the computational instance on which pane 700 is viewed to remotely access computing devices on which the unlicensed installations exist. These computing devices may be in the managed network associated with the computational instance, and the remote access may be by way of a proxy server disposed within the managed network. Further, the computational instance may cause the computing devices to uninstall, deactivate, or delete the unlicensed installations.

However, before taking a remediation action, a user might want to see further details regarding a particular license. To accomplish this, a user might select a more specific license type within the general license types of the software application. For example, as shown in FIG. 7C, the "Professional" license type of the "Reader" software application has a more specific license type of "Per User." This selection may allow a user to drill down even further in order to view detailed information regarding the specific license type. In operation, the user may select "Per User" in navigation pane 702.

Figure 7D:
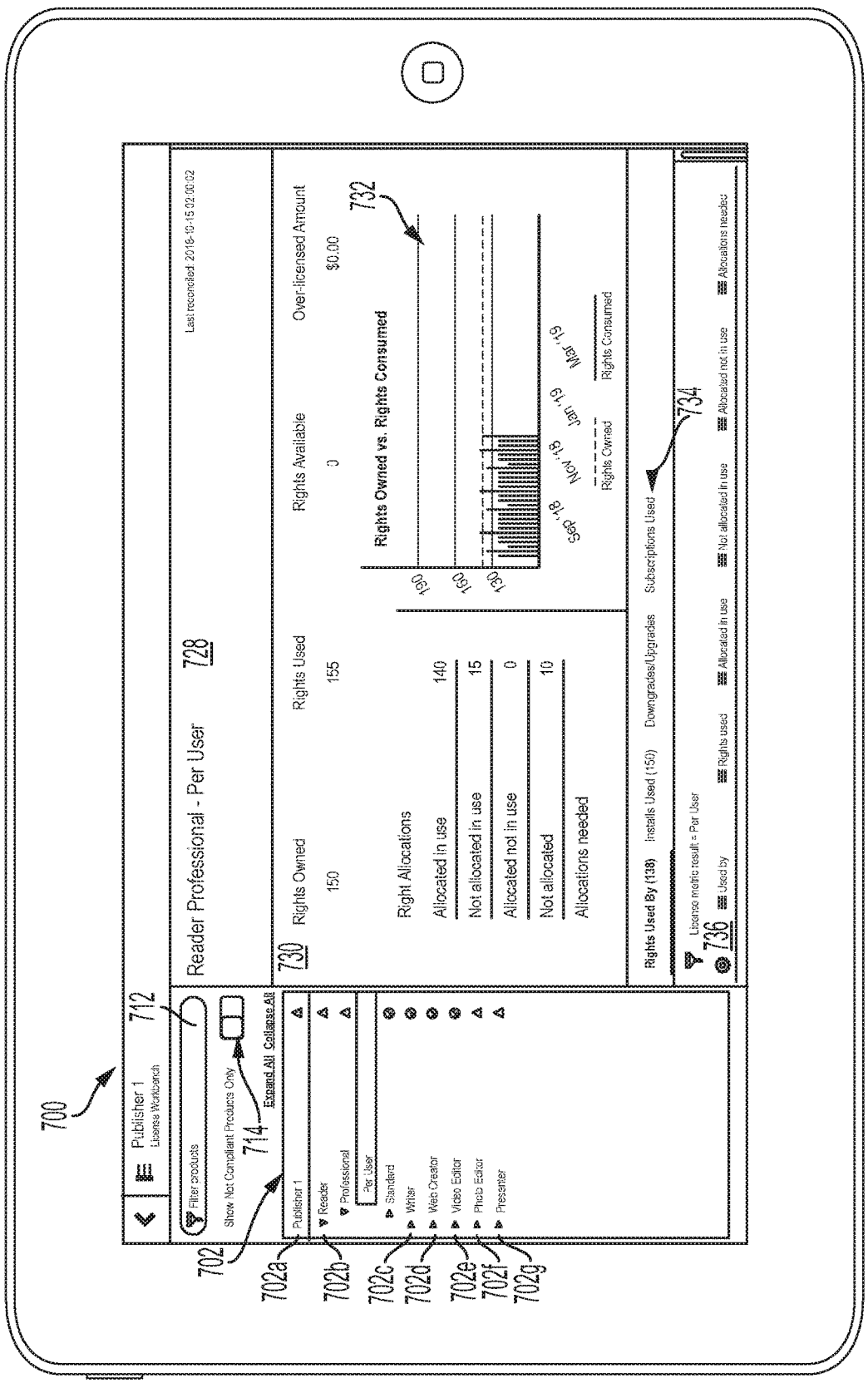
FIG. 7D depicts a detailed view of a particular software application management pane of a GUI, in accordance with example embodiments.

FIG. 7D depicts a detailed view of a particular software application management pane 700. The elements of FIG. 7D may be displayed when a user selects "Per User" in navigation pane 702. Detailed view of publisher software application management pane 700 includes the same navigation pane 702, search bar 712, and filter toggle 714, but also includes header 728, summary 730, graph 732, tabs 734, and table 736.

Header 728 may display the title of the selected specific license type within navigation pane 702. As shown in FIG. 7D, header 728 displays the title "Reader Professional—Per User," since the "Per User" option of "Professional" license type of the "Reader" software application is selected in navigation pane 702.

Summary 730 may display information related to the allocation of the selected specific license type for the selected software application. As shown in FIG. 7D, the number of rights (licenses) owned for the "Professional" license type of the "Reader" software application is 150, the number of rights used is 155, the number of rights available is 0, and the over-licensed amount is $0.00. Summary 730 also includes a table that shows that 140 of the 150 licenses are allocated and in use, 15 are not allocated but in use, 0 are allocated and unused, 10 are not allocated, and 5 allocations are needed. This information, when read by a user, would indicate that users of managed network 300 are using more installations than allowed under the license agreement. In order to remedy the discrepancy, the user may, for example, (i) allocate the 10 licenses that are not allocated to the 10 users that are using the software without a license and purchase 5 additional licenses, (ii) purchase 5 additional licenses and allocate the 10 unallocated and 5 additional licenses to the 15 unlicensed installations, or (iii) remove the unlicensed installations.

Graph 732 may display the information in summary 730 plotted to show the user the allocations of the software license over some period of time. As shown in FIG. 7D, the number of rights owned and rights consumed varied over time—at some point in September 2018, there was an under allocation of licenses, and then at some point in November 2018, there was an over allocation of licenses, which was not remedied. Graph 732 may be beneficial as it allows a user to see the allocation of software overtime, which may help the user choose an appropriate remediation action.

Tabs 734 may include selectable options to configure table 736. Tabs 734 may include options to display "Rights Used By," "Installs Used," "Downgrades/Upgrades," and "Subscriptions Used." Selecting "Rights Used By" may cause table 736 to display the computing devices on which the license is allocated and/or installed. This may be beneficial in helping the user choose a remediation option, because the user can contact the owners of the computing devices to determine whether the software is necessary to their work. Selecting "Installs Used" may cause table 736 to display a list of each software installation that is being used by a computing device. Selecting "Downgrades/Upgrades" may cause table 736 to display the availability of license upgrades or downgrades for each installation. Selecting "Subscriptions Used" may cause table 736 to display the users or computers that are currently using a software subscription. Software subscriptions may be used instead of software licenses, because software subscriptions may be structured in a way that allows unlimited usage for some fixed price per week, month, or year.

Table 736, as discussed above, is configurable based on the selection of one of tabs 734. Table 736, although not shown in FIG. 7D, may contain table rows based on the selection of tabs 734. As shown in FIG. 7D, table 736 shows information related to the "Rights Used By" tab, which is selected in tabs 734. For the "Rights Used" tab selection, table 736 has columns that show information including (i) the user or computing device using the license, (ii) the number of rights used, (iii) the number of licenses allocated and being used, (iv) the number of licenses allocated but not in use, (v) the number of allocations needed, and (vi) the number of rights (licenses) consumed. This information may be particularly beneficial in assisting a user pinpoint the exact computing devices that are causing non-compliancy under the license agreement. Using this information, a user can revoke licenses or reallocate licenses to users that are using the software but haven't been allocated a license.

While the previous discussion implies that panes of the software application management system should be presented in the order in which they were described (e.g., from the pane of FIG. 6, then to that of FIG. 7A, then to that of FIG. 7B, then to that of FIG. 7C, and then to that of FIG. 7D), this need not be the case. While the described ordering has the advantages discussed above, other orderings of these and/or other panes may be used in similarly effective workflows.

VI. EXAMPLE OPERATIONS

Figure 8:
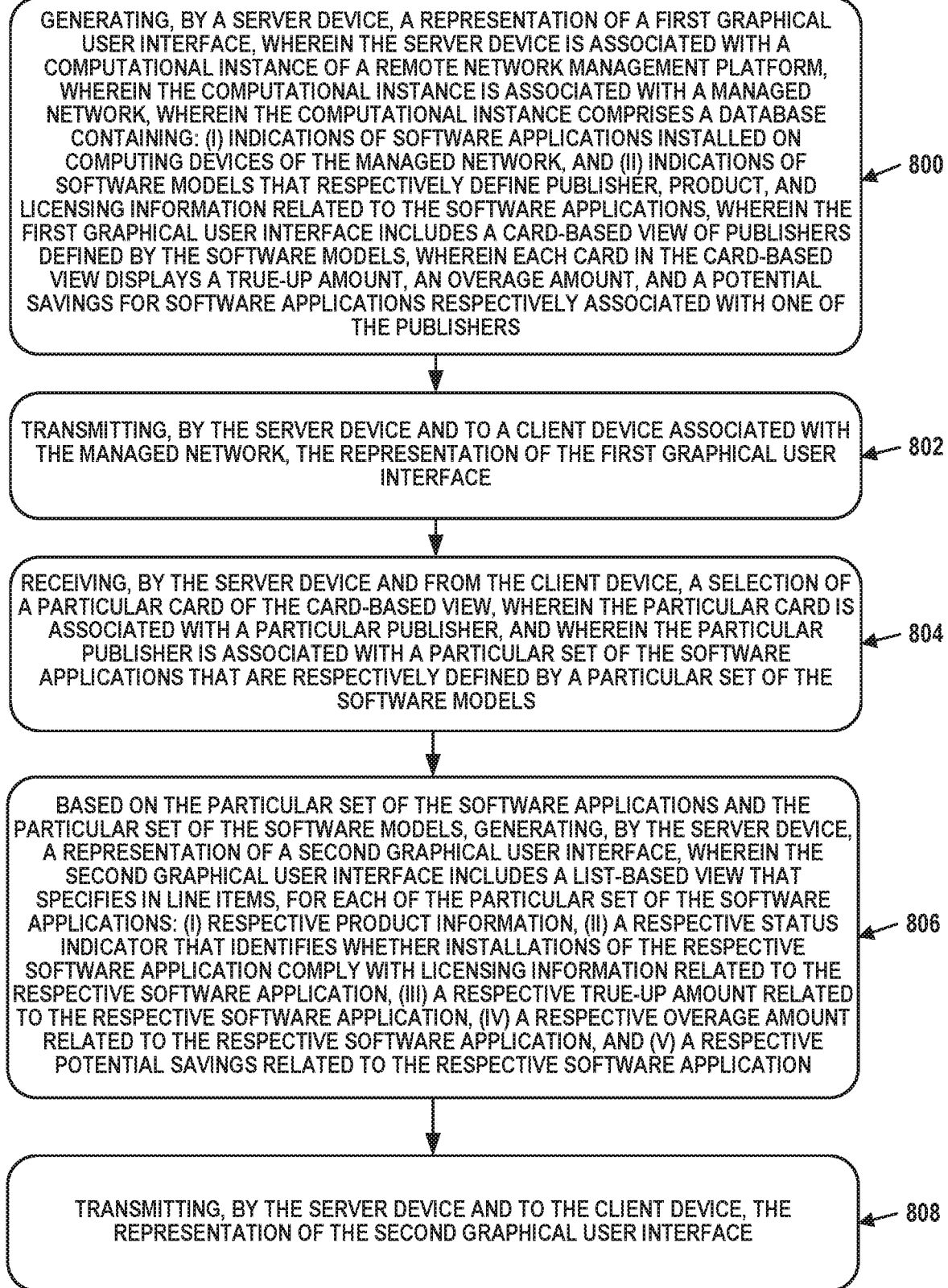
FIG. 8 is a flow chart, in accordance with example embodiments.

FIG. 8 is a flow chart illustrating an example embodiment. The process illustrated by FIG. 8 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 8 may be simplified by the removal of any one or more of the features shown therein. Further, these embodiments may be combined with features, aspects, and/or implementations of any of the previous figures or otherwise described herein.

Block 800 of FIG. 8 may involve generating, by a server device, a representation of a first graphical user interface. The server device may be associated with a computational instance of a remote network management platform and the computational instance may be associated with a managed network. The computational instance may include a database containing: (i) indications of software applications installed on computing devices of the managed network, and (ii) indications of software models that respectively define publisher, product, and licensing information related to the software applications. The first graphical user interface may include a card-based view of publishers defined by the software models, where each card in the card-based view displays a true-up amount, an overage amount, and a potential savings for software applications respectively associated with one of the publishers.

Block 802 of FIG. 8 may involve transmitting, by the server device and to a client device associated with the managed network, the representation of the first graphical user interface.

Block 804 of FIG. 8 may involve receiving, by the server device and from the client device, a selection of a particular card of the card-based view. The particular card may be associated with a particular publisher, and the particular publisher may be associated with a particular set of the software applications that are respectively defined by a particular set of the software models.

Block 806 of FIG. 8 may involve, based on the particular set of the software applications and the particular set of the software models, generating, by the server device, a representation of a second graphical user interface. The second graphical user interface may include a list-based view that specifies in line items, for each of the particular set of the software applications: (i) respective product information, (ii) a respective status indicator that identifies whether installations of the respective software application comply with licensing information related to the respective software application, (iii) a respective true-up amount related to the respective software application, (iv) a respective overage amount related to the respective software application, and (v) a respective potential savings related to the respective software application.

Block 808 of FIG. 8 may involve transmitting, by the server device and to the client device, the representation of the second graphical user interface.

Some embodiments may further involve receiving, by the server device and from the client device, a selection of a particular software application from the list-based view. These embodiments may further involve, based on the particular software application, generating, by the server device, a representation of a third graphical user interface. The third graphical user interface may include a summary view specifying a plurality of selectable tabs. Selection of a first selectable tab of the plurality of selectable tabs may display a further list-based view, where the further list-based view specifies in line items, for the particular software application: (i) an amount of licenses owned, (ii) an amount of licenses used, (iii) an amount of licenses available, (iv) an overage amount, (v) an amount of licenses allocated in use, and (vi) and amount of licenses not allocated. These embodiments may further involve transmitting, by the server device and to the client device, the representation of the third graphical user interface.

In some embodiments, selection of a second selectable tab of the plurality of selectable tabs may display a second further list-based view, where the second further list-based view specifies in line items, for the particular software application: (i) an available remedial action, (ii) a status indication, (iii) a compliance indicator, (iv) a display name, (v) an amount of actionable licenses, and (vi) a true-up amount related to the particular software application.

In some embodiments, the available remedial action includes an option to (i) remove the amount of licenses not allocated, (ii) create license allocations, (iii) secure additional licenses, or (iv) remove unlicensed instances of the particular software application.

In some embodiments, the first graphical user interface further includes a plurality of selectable tabs configured to filter the card-based view of publishers to display (i) all publishers, (ii) publishers that are out of compliance, or (iii) publishers pinned by a user via the first graphical user interface.

In some embodiments, the second graphical user interface also includes a navigation pane, where the navigation pane is configured to expand and collapse, where the navigation pane, (i) when collapsed, displays the particular set of the software applications, and (ii) when expanded, displays a plurality of versions of the particular set of the software applications.

In some embodiments, the first graphical user interface includes a search pane configurable to allow for an identification of one or more of the software applications.

In some embodiments, the cards in the card-based view of the first graphical user interface are arranged according to a sort option, where the sort option is a drop-down menu accessible in the first graphical user interface configured to arrange the card (i) alphabetically, (ii) by compliancy, (iii) by true-up amount, (iv) by overage amount, or (v) by amount of potential savings.

In some embodiments, the list-based view of the second graphical user interface is arranged proximate to a summary view and a navigation pane, where the summary view specifies a plurality of selectable tabs, where the navigation pane displays the particular set of the software applications, and where the list-based view changes upon selection of a particular software application of the particular set of the software applications in the navigation pane.

VII. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments.

Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system, comprising:
   a processor; and
   a memory storing instructions that, when executed by the processor, cause the processor to perform operations comprising:
   generating, for display on a client device, a first pane of a first graphical user interface (GUI) comprising a plurality of cards, wherein each card of the plurality of cards corresponds to a respective publisher of a plurality of publishers and displays a true-up amount, an overage amount, and a potential savings amount for software applications provided by the respective publisher;
   receiving, via the first pane of the first GUI, a selection of a particular card of the plurality of cards, wherein the particular card is associated with a particular publisher of the plurality of publishers, wherein the particular publisher provides a particular set of the software applications; and
   generating, for display on the client device, a second pane of a second GUI based on the particular set of the software applications, wherein the second pane of the second GUI comprises a list specifying, for each software application of the particular set of the software applications, a respective indication of whether installations of a respective software application comply with licensing information related to the respective software application.

2. The system of claim 1, the operations comprising:
   receiving, via the second pane of the second GUI, a selection of a particular software application from the list; and
   generating, for display on the client device, a third pane of the second GUI based on the particular software application, wherein the third pane of the second GUI comprises a plurality of selectable tabs, wherein selection of a first selectable tab of the plurality of selectable tabs causes the second GUI to display a second list specifying, for the particular software application: a number of licenses owned, a number of licenses used, and a number of licenses available.

3. The system of claim 2 wherein selection of a second selectable tab of the plurality of selectable tabs causes the second GUI to display a third list specifying, for the particular software application: an available remedial action, a compliance indicator, an amount of actionable licenses, and a true-up amount related to the particular software application.

4. The system of claim 3, wherein the available remedial action comprises an option to remove a number of licenses not allocated, create license allocations, secure additional licenses, remove unlicensed instances of the particular software application, or a combination thereof.

5. The system of claim 4, wherein the operations comprise opening, in response to selection of the option to secure additional licenses, a browser configured to allow a user to secure additional licenses.

6. The system of claim 1, wherein the first pane of the first GUI comprises a plurality of selectable tabs configured to filter the plurality of cards to display all publishers, publishers that are out of compliance, or publishers pinned by a user via the first pane of the first GUI, or a combination thereof.

7. The system of claim 1, wherein the second pane of the second GUI comprises a navigation pane, wherein the navigation pane is configured to expand and collapse, and wherein the navigation pane is configured to:
   display the particular set of the software applications when collapsed; and
   display a plurality of types of licenses that correspond to a software application of the particular set of the software applications when expanded.

8. The system of claim 7, wherein the operations comprise:

displaying, in response to a selection of a particular type of license of the plurality of types of licenses, a third pane of the second GUI comprising a number of licenses allocated in use, a number of licenses allocated and not in use, a number of licenses not allocated, and a number of licenses allocated needed to become compliant.

9. The system of claim 1, wherein the first pane of the first GUI includes a search window configurable to allow for an identification of one or more of the software applications.

10. The system of claim 1, wherein the cards in the first pane of the first GUI are arranged according to a sort option, wherein the sort option is a drop-down menu accessible in the first pane of the first GUI and is configured to arrange the cards alphabetically, by compliancy, by true-up amount, by overage amount, or by amount of potential savings.

11. The system of claim 1, wherein the second pane of the second GUI comprises a user selectable filter toggle configured to cause the second GUI to exclude from display, software applications of the particular set of the software applications that comply with licensing information related to the respective software application.

12. A method comprising:
generating, for display on a client device, a first pane of a first graphical user interface (GUI) comprising a plurality of cards, wherein each card of the plurality of cards corresponds to a respective publisher and displays a true-up amount, an overage amount, and a potential savings for software applications provided by the respective publisher;
receiving, via the first pane of the first GUI, a selection of a particular card of the plurality of cards, wherein the particular card is associated with a particular publisher, and wherein the particular publisher provides a particular set of the software applications; and
generating, for display on the client device, a second pane of a second GUI based on the particular set of the software applications, wherein the second pane of the second GUI comprises a list specifying, for each of the particular set of the software applications a respective indication of whether installations of a respective software application comply with licensing information related to the respective software application.

13. The method of claim 12, comprising:
receiving, via the second pane of the second GUI, a selection of a particular software application from the list; and
generating, for display on the client device, a third pane of the second GUI based on the particular software application, wherein the third pane of the second GUI comprises a plurality of selectable tabs, wherein selection of a first selectable tab of the plurality of selectable tabs displays a second list specifying, for the particular software application: an amount of licenses owned, an amount of licenses used, and an amount of licenses available.

14. The method of claim 13, wherein selection of a second selectable tab of the plurality of selectable tabs causes the second GUI to display a third list specifying, for the particular software application: an available remedial action, a compliance indicator, an amount of actionable licenses, and a true-up amount related to the particular software application.

15. The method of claim 12, wherein the second GUI comprises a navigation pane configured to expand and collapse, and wherein the navigation pane is configured to:
display the particular set of the software applications when collapsed; and
display a plurality of types of licenses that correspond to a software application of the particular set of the software applications when expanded.

16. The method of claim 15, comprising generating, in response to a selection of a particular type of license of the plurality of types of licenses, a third pane of the second GUI comprising information comprising a number of licenses allocated in use, a number of licenses allocated and not in use, a number of licenses not allocated, and a number of licenses allocated needed to become compliant.

17. The method of claim 12, wherein the cards in the first pane of the first GUI are arranged according to a sort option, wherein the sort option is a drop-down menu accessible in the first GUI and configured to arrange the card alphabetically, by compliancy, by true-up amount, by overage amount, or by amount of potential savings.

18. The method of claim 12, wherein the second pane of the second GUI comprises a user selectable filter toggle configured to cause the second GUI to exclude from display, software applications of the particular set of the software applications that comply with licensing information related to the respective software application.

19. A tangible, non-transitory, and computer-readable medium, storing instructions that, upon execution by a processor, cause the processor to perform operations comprising:
generating, for display on a client device, a first pane of a first graphical user interface (GUI) comprising a plurality of cards, wherein each card of the plurality of cards corresponds to a respective publisher of a plurality of publishers and displays a true-up amount, an overage amount, and a potential savings amount for software applications provided by the respective publisher;
receiving, via the first pane of the first GUI, a selection of a particular card of the plurality of cards, wherein the particular card is associated with a particular publisher, and wherein the particular publisher provides a particular set of the software applications; and
generating, for display on the client device, a second pane of a second GUI based on the particular set of the software applications, wherein the second pane of the second GUI comprises a list specifying, for each of the particular set of the software applications a respective indication of whether installations of a respective software application comply with licensing information related to the respective software application.

20. The tangible, non-transitory, and computer-readable medium of claim 19, wherein the instructions cause the processor to perform operations comprising:
receiving, via the second pane of the second GUI, a selection of a particular software application from the list; and
generating, for display on the client device, a third pane of the second GUI based on the particular software application, wherein the third pane of the second GUI comprises a plurality of selectable tabs, wherein selection of a first selectable tab of the plurality of selectable tabs causes the second GUI to display a second list specifying, for the particular software application: a number of licenses owned, a number of licenses used, and a number of licenses available.

* * * * *

UNITED STATES PATENT AND TRADEMARK OFFICE
CERTIFICATE OF CORRECTION

| | |
|---|---|
| PATENT NO. | : 10,824,305 B1 |
| APPLICATION NO. | : 16/871468 |
| DATED | : November 3, 2020 |
| INVENTOR(S) | : Nirali Vora, Yiwen Wang and Robert Toshihiro Asami |

It is certified that error appears in the above-identified patent and that said Letters Patent is hereby corrected as shown below:

On the Title Page

Item (72), at the end of Line 2, please add --Robert Toshihiro Asami, Sunnyvale, CA (US)--.

Signed and Sealed this
Seventeenth Day of September, 2024

Katherine Kelly Vidal
*Director of the United States Patent and Trademark Office*